US007452839B2

(12) United States Patent
Cheng et al.

(10) Patent No.: US 7,452,839 B2
(45) Date of Patent: *Nov. 18, 2008

(54) GASOLINE SULFUR REDUCTION IN FLUID CATALYTIC CRACKING

(75) Inventors: Wu-Cheng Cheng, Ellicott City, MD (US); Terry G. Roberie, Ellicott City, MD (US); Hye Kyung Cho Timken, Woodbury, NJ (US); Scott Kevin Purnell, Ellicott City, MD (US); Xinjin Zhao, Columbia, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 578 days.

This patent is subject to a terminal disclaimer.

(21) Appl. No.: 11/013,481

(22) Filed: Dec. 16, 2004

(65) Prior Publication Data

US 2005/0130834 A1 Jun. 16, 2005

Related U.S. Application Data

(62) Division of application No. 09/221,539, filed on Dec. 28, 1998, now Pat. No. 6,846,403.

(51) Int. Cl.
*B01J 29/06* (2006.01)

(52) U.S. Cl. .............................. 502/64; 502/60; 502/73; 502/65; 502/69

(58) Field of Classification Search .................. 502/60, 502/73, 64, 65, 79
See application file for complete search history.

(56) References Cited

U.S. PATENT DOCUMENTS

| | | | |
|---|---|---|---|
| 3,293,192 A | 12/1966 | Maher et al. .................. 252/430 |
| 3,354,078 A | 11/1967 | Miale et al. ................... 208/120 |
| 3,402,996 A | 9/1968 | Maher et al. ..................... 23/112 |
| 3,607,043 A | 9/1971 | McDaniel et al. ............. 23/111 |
| 3,676,368 A | 7/1972 | Scherzer et al. .......... 252/455 Z |
| 3,711,422 A | 1/1973 | Johnson et al. ............. 252/414 |
| 3,977,963 A | 8/1976 | Readal et al. ................ 208/120 |
| 4,115,249 A | 9/1978 | Blanton et al. ............... 208/120 |
| 4,153,534 A | 5/1979 | Vasalos ........................ 208/120 |
| 4,153,535 A | 5/1979 | Vasalos et al. .............. 208/120 |
| 4,340,465 A * | 7/1982 | Miller et al. ............ 208/120.15 |
| 4,440,871 A | 4/1984 | Lok et al. ...................... 502/214 |
| 4,500,651 A | 2/1985 | Lok et al. ...................... 502/208 |
| 4,544,143 A | 10/1985 | Cooper et al. ................. 266/271 |
| 4,549,956 A * | 10/1985 | Chu ......................... 208/120.15 |
| 4,567,029 A | 1/1986 | Wilson et al. ................ 423/306 |
| 4,683,217 A | 7/1987 | Lok et al. ...................... 502/214 |
| 4,686,092 A | 8/1987 | Lok et al. .................... 423/306 |
| 4,744,970 A | 5/1988 | Lok et al. .................... 423/306 |
| 4,758,419 A | 7/1988 | Lok et al. .................... 423/306 |
| 4,790,982 A | 12/1988 | Yoo et al. .................... 423/239 |
| 4,793,984 A | 12/1988 | Lok et al. .................... 423/306 |
| 4,935,216 A | 6/1990 | Lok et al. .................... 423/328 |
| 4,957,718 A | 9/1990 | Yoo et al. .................... 423/244 |
| 4,957,892 A | 9/1990 | Yoo et al. ...................... 502/63 |
| 4,963,520 A | 10/1990 | Yoo et al. ...................... 502/64 |
| 5,098,684 A | 3/1992 | Kresge et al. ................ 423/277 |
| 5,102,643 A | 4/1992 | Kresge et al. ................ 423/328 |
| 5,198,203 A | 3/1993 | Kresge et al. ................ 423/718 |
| 5,376,608 A | 12/1994 | Wormsbecher et al. ........ 502/61 |
| 5,407,878 A | 4/1995 | Kim ............................... 502/41 |
| 5,525,210 A | 6/1996 | Wormsbecher et al. ..... 208/122 |
| 5,705,729 A * | 1/1998 | Huang .......................... 585/722 |
| 6,974,787 B2 * | 12/2005 | Chester et al. ................. 502/65 |

FOREIGN PATENT DOCUMENTS

EP 0 159 624 B1 12/1991

OTHER PUBLICATIONS

Venuto and Habib, Fluid Catalytic Crackling with Zeolite Catalysts, Marcel Dekker, New York 1979, ISBN 0-8247-6870-1, pp. 32-37.

Richard F. Wormsbecher, Alan W. Peters, and James M. Maselli, "Vanadium Poisoning of Cracking Catalysts: Mechanism of Poisoning and Design of Vanadium Tolerant Catalyst System", Journal of Catalyst, vol. 100, pp. 130-137 (1986).

Occelli, M.L., "Metal Resistant Fluid Cracking Catalysts", ACS Symposium Series, Ch 21, pp. 343-362 (1990).

"Shape Selective Catalysis in Industrial Applications"; Chen et al., Marcel Dekker Inc., New York 1969, ISBN 0-8247-7856-1, pp. 7-38.

Journal of Catalysis, vol. 67, pp. 218-222 (1981) by Frilette et al.

Journal of Catalysis, vol. 4, pp. 527-529 (1965); vol. 6, pp. 278-287 (1966); and vol. 61, pp. 390-396 (1980).

(Continued)

*Primary Examiner*—Elizabeth D Wood
(74) *Attorney, Agent, or Firm*—Charles A. Cross; Beverly J. Artale

(57) ABSTRACT

The sulfur content of liquid cracking products, especially the cracked gasoline, of the catalytic cracking process is reduced by the use of a sulfur reduction catalyst composition comprising a porous molecular sieve which contains a metal in an oxidation state above zero within the interior of the pore structure of the sieve as well as a rare earth component which enhances the cracking activity of the cracking catalyst. The molecular sieve is normally a faujasite such as USY. The primary sulfur reduction component is normally a metal of Period 3 of the Periodic Table, preferably vanadium. The rare earth component preferably includes cerium which enhances the sulfur reduction activity of the catalyst. The sulfur reduction catalyst may be used in the form of a separate particle additive or as a component of an integrated cracking/sulfur reduction catalyst.

13 Claims, No Drawings

OTHER PUBLICATIONS

Scherzer, "Octane Enhancing Zeolitic FCC Catalysts", Marcel Dekker, New York, 1990, ISBN 0-8247-8399-9, pp. 165-182.

Intercat, Refining Developments, "Additives Improve FCC Process", Hydrocarbon Processing, Nov. 1991, pp. 59-66, by A.S. Krishna, C.R. Hsieh, A.R. English, T.A. Pecararo and C.W. Kuehler, Chevron Research and Technology Company, Richmond, CA.

"Fluid Catalytic Cracking Handbook", Sadeghbeigi, Gulf Publishing, Houston, Texas, ISBN 0-88415-290-1, Ch. 3, pp. 79 and 88-91, no date.

* cited by examiner

GASOLINE SULFUR REDUCTION IN FLUID CATALYTIC CRACKING

CROSS REFERENCE TO RELATED APPLICATIONS

This application is a divisional of application Ser. No. 09/221,539, filed Dec. 28, 1998, now U.S. Pat. No. 6,846,403 B2.

This application is related to application Ser. No. 09/144,607, filed Aug. 31, 1998, now U.S. Pat. No. 6,852,214 B1.

Application Ser. No. 09/221,540, filed on Dec. 28, 1998, now abandoned, of which U.S. Pat. No. 6,974,787 B2 is a continuation-in-part, describes catalyst compositions for the reduction or sulfur in gasoline based on large pore zeolites, especially zeolite USY, which contain vanadium and cerium.

FIELD OF THE INVENTION

This invention relates to the reduction of sulfur in gasolines and other petroleum products produced by the catalytic cracking process. The invention provides a catalytic composition for reducing product sulfur and a process for reducing the product sulfur using this composition.

BACKGROUND OF THE INVENTION

Catalytic cracking is a petroleum refining process which is applied commercially on a very large scale, especially in the United States where the majority of the refinery gasoline blending pool is produced by catalytic cracking, with almost all of this coming from the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is so converted into gasoline, distillate and other liquid cracking products as well as lighter gaseous cracking products of four or less carbon atoms per molecule. The gas partly consists of olefins and partly of saturated hydrocarbons.

During the cracking reactions some heavy material, known as coke, is deposited onto the catalyst. This reduces its catalytic activity and regeneration is desired. After removal of occluded hydrocarbons from the spent cracking catalyst, regeneration is accomplished by burning off the coke and then the catalyst activity is restored. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Catalytic cracking feedstocks normally contain sulfur in the form of organic sulfur compounds such as mercaptans, sulfides and thiophenes. The products of the cracking process correspondingly tend to contain sulfur impurities even though about half of the sulfur is converted to hydrogen sulfide during the cracking process, mainly by catalytic decomposition of non-thiophenic sulfur compounds. The distribution of sulfur in the cracking products is dependent on a number of factors including feed, catalyst type, additives present, conversion and other operating conditions but, in any event a certain proportion of the sulfur tends to enter the light or heavy gasoline fractions and passes over into the product pool. With increasing environmental regulation being applied to petroleum products, for example in the Reformulated Gasoline (RFG) regulations, the sulfur content of the products has generally been decreased in response to concerns about the emissions of sulfur oxides and other sulfur compounds into the air following combustion processes.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefins are saturated.

From the economic point of view, it would be desirable to achieve sulfur removal in the cracking process itself since this would effectively desulfurize the major component of the gasoline blending pool without additional treatment. Various catalytic materials have been developed for the removal of sulfur during the FCC process cycle but, so far, most developments have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed. See Krishna et al, Additives Improve FCC Process, Hydrocarbon Processing, November 1991, pages 59-66. The sulfur is removed from the stack gases from the regenerator but product sulfur levels are not greatly affected, if at all.

An alternative technology for the removal of sulfur oxides from regenerator removal is based on the use of magnesium-aluminum spinels as additives to the circulating catalyst inventory in the FCCU. Under the designation DESOX™ used for the additives in this process, the technology has achieved a notable commercial success. Exemplary patents on this type of sulfur removal additive include U.S. Pat. Nos. 4,963,520; 4,957,892; 4,957,718; 4,790,982 and others. Again, however, product sulfur levels are not greatly reduced.

A catalyst additive for the reduction of sulfur levels in the liquid cracking products is proposed by Wormsbecher and Kim in U.S. Pat. Nos. 5,376,608 and 5,525,210, using a cracking catalyst additive of an alumina-supported Lewis acid for the production of reduced-sulfur gasoline but this system has not achieved significant commercial success. The need for an effective additive for reducing the sulfur content of liquid catalytic cracking products has therefore persisted.

In application Ser. No. 09/144,607, filed 31 Aug. 1998, we have described catalytic materials for use in the catalytic cracking process which are capable of reducing the sulfur content of the liquid products of the cracking process. These sulfur reduction catalysts comprise, in addition to a porous molecular sieve component, a metal in an oxidation state above zero within the interior of the pore structure of the sieve. The molecular sieve is in most cases a zeolite and it may be a zeolite having characteristics consistent with the large pore zeolites such as zeolite beta or zeolite USY or with the intermediate pore size zeolites such as ZSM-5. Non-zeolitic molecular sieves such as MeAPO-5, MeAPSO-5, as well as the mesoporous crystalline materials such as MCM-41 may be used as the sieve component of the catalyst. Metals such as vanadium, zinc, iron, cobalt, and gallium were found to be effective for the reduction of sulfur in the gasoline, with vanadium being the preferred metal. When used as a separate particle additive catalyst, these materials are used in combination with the active catalytic cracking catalyst (normally a faujasite such as zeolite Y, especially as zeolite USY) to process hydrocarbon feedstocks in the fluid catalytic cracking (FCC) unit to produce low-sulfur. Since the sieve component of the sulfur reduction catalyst may itself be an active cracking catalyst, for instance, zeolite USY, it is also possible to use the sulfur reduction catalyst in the form of an integrated cracking/sulfur reduction catalyst system, for example, comprising USY as the active cracking component and the sieve component of the sulfur reduction system together with added matrix material such as silica, clay and the metal, e.g. vanadium, which provides the sulfur reduction functionality.

Another consideration in the manufacture of FCC catalysts has been catalyst stability, especially hydrothermal stability since cracking catalysts are exposed during use to repeated cycles of reduction (in the cracking step) followed by stripping with steam and then by oxidative regeneration which produces large amounts of steam from the combustion of the coke, a carbon-rich hydrocarbon, which is deposited on the catalyst particles during the cracking portion of the cycle. Early in the development of zeolitic cracking catalysts it was found that a low sodium content was required not only for optimum cracking activity but also for stability and that the rare earth elements such as cerium and lanthanum conferred greater hydrothermal stability. See, for example, Fluid Catalytic Cracking with Zeolite Catalysts, Venuto et al., Marcel Dekker, New York, 1979, ISBN 0-8247-6870-1.

SUMMARY OF THE INVENTION

We have now developed catalytic materials for use in the catalytic cracking process which are capable of improving the reduction in the sulfur content of the liquid products of the cracking process including, in particular, the gasoline and middle distillate cracking fractions. The present sulfur reduction catalyst are similar to the ones described in application Ser. No. 09/144,607 in that a metal component in an oxidation state above zero is present in the pore structure of a molecular sieve component of the catalyst composition, with preference again being given to vanadium. In the present case, however, the composition also comprises one or more rare earth elements. We have found that the presence of the rare earth component enhances the stability of the catalyst, as compared to the catalysts which contain only vanadium or another metal component and that in certain favorable cases, the sulfur reduction activity is also increased by the presence of the rare earth elements. This is surprising since the rare earth cations in themselves have no sulfur reduction activity.

The present sulfur reduction catalysts may be used in the form of an additive catalyst in combination with the active cracking catalyst in the cracking unit, that is, in combination with the conventional major component of the circulating cracking catalyst inventory which is usually a matrixed, zeolite containing catalyst based on a faujasite zeolite, usually zeolite Y. Alternatively, they may be used in the form of an integrated cracking/product sulfur reduction catalyst system.

According to the present invention, the sulfur removal catalyst composition comprises a porous molecular sieve that contains (i) a metal in an oxidation state above zero within the interior of the pore structure of the sieve and (ii) a rare earth component. The molecular sieve is in most cases a zeolite and it may be a zeolite having characteristics consistent with the large pore zeolites such as zeolite beta or zeolite USY or with the intermediate pore size zeolites such as ZSM-5. Non-zeolitic molecular sieves such as MeAPO-5, MeAPSO-5, as well as the mesoporous crystalline materials such as MCM-41 may be used as the sieve component of the catalyst. Metals such as vanadium, zinc, iron, cobalt, and gallium are effective. If the selected sieve material has sufficient cracking activity, it may be used as the active catalytic cracking catalyst component (normally a faujasite such as zeolite Y) or, alternatively, it may be used in addition to the active cracking component, whether or not it has any cracking activity of itself. The present compositions are useful to process hydrocarbon feedstocks in fluid catalytic cracking (FCC) units to produce low-sulfur gasoline and other liquid products, for example, light cycle oil that can be used as a low sulfur diesel blend component or as heating oil.

While the mechanism by which the metal-containing zeolite catalyst compositions remove the sulfur components normally present in cracked hydrocarbon products is not precisely understood, it does involve the conversion of organic sulfur compounds in the feed to inorganic sulfur so that the process is a true catalytic process. In this process, it is believed that a zeolite or other molecular sieve provides shape selectivity with varying pore size, and the metal sites in zeolite provide adsorption sites for the sulfur species.

DRAWINGS

The drawings are graphs which show the performance of the present sulfur reduction compositions as described below.

DETAILED DESCRIPTION

FCC Process

The present sulfur removal catalysts are used as a catalytic component of the circulating inventory of catalyst in the catalytic cracking process, which these days is almost invariably the fluid catalytic cracking (FCC) process. For convenience, the invention will be described with reference to the FCC process although the present additives could be used in the older moving bed type (TCC) cracking process with appropriate adjustments in particle size to suit the requirements of the process. Apart from the addition of the present additive to the catalyst inventory and some possible changes in the product recovery section, discussed below, the manner of operating the process will remain unchanged. Thus, conventional FCC catalysts may be used, for example, zeolite based catalysts with a faujasite cracking component as described in the seminal review by Venuto and Habib, Fluid Catalytic Cracking with Zeolite Catalysts, Marcel Dekker, New York 1979, ISBN 0-8247-6870-1 as well as in numerous other sources such as Sadeghbeigi, Fluid Catalytic Cracking Handbook, Gulf Publ. Co. Houston, 1995, ISBN 0-88415-290-1.

Somewhat briefly, the fluid catalytic cracking process in which the heavy hydrocarbon feed containing the organosulfur compounds will be cracked to lighter products takes place by contact of the feed in a cyclic catalyst recirculation cracking process with a circulating fluidizable catalytic cracking catalyst inventory consisting of particles having a size ranging from about 20 to about 100 microns. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

In the present process, the sulfur content of the gasoline portion of the liquid cracking products, is effectively brought to lower and more acceptable levels by carrying out the catalytic cracking in the presence of the sulfur reduction catalyst.

FCC Cracking Catalyst

The present sulfur reduction catalyst compositions may be used in the form of a separate particle additive which is added to the main cracking catalyst in the FCCU or, alternatively, they may be used as components of the cracking catalyst to provide an integrated cracking/sulfur reduction catalyst system. The cracking component of the catalyst which is conventionally present to effect the desired cracking reactions and the production of lower boiling cracking products, is normally based on a faujasite zeolite active cracking component, which is conventionally zeolite Y in one of its forms such as calcined rare-earth exchanged type Y zeolite (CREY), the preparation of which is disclosed in U.S. Pat. No. 3,402,996, ultrastable type Y zeolite (USY) as disclosed in U.S. Pat. No. 3,293,192, as well as various partially exchanged type Y zeolites as disclosed in U.S. Pat. Nos. 3,607,043 and 3,676,368. Cracking catalysts such as these are widely available in large quantities from various commercial suppliers. The active cracking component is routinely combined with a matrix material such as silica or alumina as well as a clay in order to provide the desired mechanical characteristics (attrition resistance etc.) as well as activity control for the very active zeolite component or components. The particle size of the cracking catalyst is typically in the range of 10 to 100 microns for effective fluidization. If used as a separate particle additive, the sulfur reduction catalyst (and any other additive) is normally selected to have a particle size and density comparable to that of the cracking catalyst so as to prevent component separation during the cracking cycle.

Sulfur Reduction System—Sieve Component

According to the present invention, the sulfur removal catalyst comprises a porous molecular sieve which contains a metal in an oxidation state above zero within the interior of the pore structure of the sieve. The molecular sieve is in most cases a zeolite and it may be a zeolite having characteristics consistent with the large pore zeolites such as zeolite Y, preferably as zeolite USY, or zeolite beta or with the intermediate pore size zeolites such as ZSM-5, with the former class being preferred.

The molecular sieve component of the present sulfur reduction catalysts may, as noted above, be a zeolite or a non-zeolitic molecular sieve. When used, zeolites may be selected from the large pore size zeolites or intermediate pore zeolites (see Shape Selective Catalysis in Industrial Applications, Chen et al, Marcel Dekker Inc., New York 1989, ISBN 0-8247-7856-1, for a discussion of zeolite classifications by pore size according to the basic scheme set out by Frilette et al in J. Catalysis 67, 218-222 (1981)). The small pore size zeolites such as zeolite A and erionite, besides having insufficient stability for use in the catalytic cracking process, will generally not be preferred because of their molecular size exclusion properties which will tend to exclude the components of the cracking feed as well as many components of the cracked products. The pore size of the sieve does not, however, appear to be critical since, as shown below, both medium and large pore size zeolites have been found to be effective, as have the mesoporous crystalline materials such as MCM-41.

Zeolites having properties consistent with the existence of a large pore (12 ring) structure which may be used to make the present sulfur reduction catalysts include zeolites Y in its various forms such as Y, REY, CREY, USY, of which the last is preferred, as well as other zeolites such as zeolite L, zeolite beta, mordenite including de-aluminated mordenite, and zeolite ZSM-18. Generally, the large pore size zeolites are characterized by a pore structure with a ring opening of at least 0.7 nm and the medium or intermediate pore size zeolites will have a pore opening smaller than 0.7 nm but larger than about 0.56 nm. Suitable medium pore size zeolites which may be used include the pentasil zeolites such as ZSM-5, ZSM-22, ZSM-23, ZSM-35, ZSM-50, ZSM-57, MCM-22, MCM-49, MCM-56 all of which are known materials. Zeolites may be used with framework metal elements other than aluminum, for example, boron, gallium, iron, chromium.

The use of zeolite USY is particularly desirable since this zeolite is typically used as the active cracking component of the cracking catalyst and it is therefore possible to use the sulfur reduction catalyst in the form of an integrated cracking/sulfur reduction catalyst system. The USY zeolite used for the cracking component may also, to advantage, be used as the sieve component for a separate particle additive catalyst as it will continue to contribute to the cracking activity of the overall catalyst present in the unit. Stability is correlated with low unit cell size with USY and, for optimum results, the UCS for the USY zeolite in the finished catalyst should be from 2.420 to 2.455 nm, preferably 2.420 to 2.445 nm, with the range of 2.435 to 2.440 nm being very suitable. After exposure to the repeated steaming of the FCC cycles, further reductions in UCS will take place to a final value which is normally within the range of 2.420 to 2.430 nm.

In addition to the zeolites, other molecular sieves may be used although they may not be as favorable since it appears that some acidic activity (conventionally measured by the alpha value) is required for optimum performance. Experimental data indicate that alpha values in excess of about 10 (sieve without metal content) are suitable for adequate desulfurization activity, with alpha values in the range of 0.2 to 2,000 being normally suitable. Alpha values from 0.2 to 300 represent the normal range of acidic activity for these materials when used as additives.

[1] The alpha test is a convenient method of measuring the overall acidity, inclusive of both its internal and external acidity, of a solid material such as a molecular sieve. The test is described in U.S. Pat. No. 3,354,078; in the Journal of Catalysis, Vol. 4, p. 527 (1965); Vol. 6, p. 278 (1966); and Vol. 61, p. 395 (1980). Alpha values reported in this specification are measured at a constant temperature of 538° C.

Exemplary non-zeolitic sieve materials which may provide suitable support components for the metal component of the present sulfur reduction catalysts include silicates (such as the metallosilicates and titanosilicates) of varying silica-alumina ratios, metalloaluminates (such as germaniumaluminates), metallophosphates, aluminophosphates such as the silico- and metalloaluminophosphates referred to as metal integrated aluminophosphates (MeAPO and ELAPO), metal integrated silicoaluminophosphates (MeAPSO and ELAPSO), silicoaluminophosphates (SAPO), gallogermanates and combinations of these. A discussion on the structural relationships of SAPO's, AlPO's, MeAPO's, and MeAPSO's may be found in a number of resources including Stud. Surf. Catal. 37 13-27 (1987). The AlPO's contain aluminum and phosphorus, whilst in the SAPO's some of the phosphorus and/or some of both phosphorus and aluminum is replaced by silicon. In the MeAPO's various metals are present, such as Li, B, Be, Mg, Ti, Mn, Fe, Co, An, Ga, Ge, and As, in addition to aluminum and phosphorus, whilst the MeAPSO's additionally contain silicon. The negative charge of the $Me_aAl_bP_cSi_dO_e$ lattice is compensated by cations, where Me is magnesium, manganese, cobalt, iron and/or zinc. MexAPSO's are described in U.S. Pat. No. 4,793,984. SAPO-type sieve materials are described in U.S. Pat. No. 4,440,871; MeAPO type catalysts are described in U.S. Pat. Nos. 4,544,143 and 4,567,029; ELAPO catalysts are described in U.S. Pat. No. 4,500,651, and ELAPSO catalysts are described in European Patent Application 159,624. Specific molecular sieves are described, for example, in the following patents: MgAPSO or MAPSO-U.S. Pat. No. 4,758, 419. MnAPSO-U.S. Pat. No. 4,686,092; CoAPSO-U.S. Pat. No. 4,744,970; FeAPSO-U.S. Pat. No. 4,683,217 and ZnAPSO U.S. Pat. No. 4,935,216. Specific silicoaluminophosphates which may be used include SAPO-11, SAPO-17, SAPO-34, SAPO-37; other specific sieve materials include MeAPO-5, MeAPSO-5.

Another class of crystalline support materials which may be used is the group of mesoporous crystalline materials exemplified by the MCM-41 and MCM-48 materials. These mesoporous crystalline materials are described in U.S. Pat. Nos. 5,098,684; 5,102,643; and 5,198,203. MCM-41, which is described in U.S. Pat. No. 5,098,684, is characterized by a microstructure with a uniform, hexagonal arrangement of pores with diameters of at least about 1.3 nm: after calcination it exhibits an X-ray diffraction pattern with at least one d-spacing greater than about 1.8 nm and a hexagonal electron diffraction pattern that can be indexed with a d100 value greater than about 1.8 nm which corresponds to the d-spacing of the peak in the X-ray diffraction pattern. The preferred catalytic form of this material is the aluminosilicate although other metallosilicates may also be utilized. MCM-48 has a cubic structure and may be made by a similar preparative procedure.

Metal Components

Two metal components are incorporated into the molecular sieve support material to make up the present catalytic compositions. One component is a rare earth such as lanthanum or a mixture of rare earth elements such as cerium and lanthanum. The other metal component can be regarded as the primary sulfur reduction component although the manner in which it effects sulfur reduction is not clear, as discussed in application Ser. No. 09/144,607, to which reference is made for a description of sulfur reduction catalyst compositions containing vanadium and other metal components effective for this purpose. For convenience this component of the composition will be referred to in this application as the primary sulfur reduction component. In order to be effective, this metal (or metals) should be present inside the pore structure of the sieve component. Metal-containing zeolites and other molecular sieves can be prepared by (1) post-addition of metals to the sieve or to a catalyst containing the sieve(s), (2) synthesis of the sieve(s) containing metal atoms in the framework structure, and by (3) synthesis of the sieve(s) with trapped, bulky metal ions in the zeolite pores. Following addition of the metal component, washing to remove unbound ionic species and drying and calcination should be performed. These techniques are all known in themselves. Post-addition of the metal ions is preferred for simplicity and economy, permitting available sieve materials to be converted to use for the present additives. A wide variety of post-addition methods of metals can be used to produce a catalyst of our invention, for example, aqueous exchange of metal ions, solid-state exchange using metal halide salt(s), impregnation with a metal salt solution, and vapor deposition of metals. In each case, however, it is important to carry out the metal(s) addition so that the metal component enters the pore structure of the sieve component.

It has been found that when the metal of the primary sulfur reduction component is present as exchanged cationic species in the pores of the sieve component, the hydrogen transfer activity of the metal component is reduced to the point that hydrogen transfer reactions taking place during the cracking process will normally maintained at an acceptably low level with the preferred metal components. Thus, coke and light gas make during cracking increase slightly but they remain within tolerable limits. Since the unsaturated light ends can be used in any event as alkylation feed and in this way recycled to the gasoline pool, there is no significant loss of gasoline range hydrocarbons incurred by the use of the present additives.

Because of the concern for excessive coke and hydrogen make during the cracking process, the metals for incorporation into the additives should not exhibit hydrogenation activity to a marked degree. For this reason, the noble metals such as platinum and palladium which possess strong hydrogenation-dehydrogenation functionality are not desirable. Base metals and combinations of base metals with strong hydrogenation functionality such as nickel, molybdenum, nickel-tungsten, cobalt-molybdenum and nickel-molybdenum are not desirable for the same reason. The preferred base metals are the metals of Period 3, Groups 5, 8, 9, 12, (IUPAC classification, previously Groups 2B, 5B and 8B) of the Periodic Table. Vanadium, zinc, iron, cobalt, and gallium are effective with vanadium being the preferred metal component. It is surprising that vanadium can be used in this way in an FCC catalyst composition since vanadium is normally thought to have a very serious effect on zeolite cracking catalysts and much effort has been expended in developing vanadium suppressers. See, for example, Wormsbecher et al, Vanadium Poisoning of Cracking Catalysts: Mechanism of Poisoning and Design of Vanadium Tolerant Catalyst System, J. Catalysis 100, 130-137 (1986). It is believed that the location of the vanadium inside the pore structure of the sieve immobilizes the vanadium and prevents it from becoming vanadic acid species which can combine deleteriously with the sieve component; in any event, the present zeolite-based sulfur reduction catalysts containing vanadium as the metal component have undergone repeated cycling between reductive and oxidative/steaming conditions representative of the FCC cycle while retaining the characteristic zeolite structure, indicating a different environment for the metal.

Vanadium is particularly suitable for gasoline sulfur reduction when supported on zeolite USY. The yield structure of the V/USY sulfur reduction catalyst is particularly interesting. While other zeolites, after metals addition, demonstrate gasoline sulfur reduction, they tend to convert gasoline to C3 and C4 gas. Even though much of the converted C3= and C4= can be alkylated and re-blended back to the gasoline pool, the high C4– wet gas yield may be a concern since many refineries are limited by their wet gas compressor capacity. The metal-containing USY has similar yield structure to current FCC catalysts; this advantage would allow the V/USY zeolite content in a catalyst blend to be adjusted to a target desulfurization level without limitation from FCC unit constraints. The vanadium on Y zeolite catalyst, with the zeolite represented by USY, is therefore a particularly favorable combination for gasoline sulfur reduction in FCC. The USY which has been found to give particularly good results is a USY with low unit cell size in the range from 2.420 to 2.450 nm, preferably 2.435 to 2.450 nm (following treatment) and a correspondingly low alpha value. Combinations of base metals such as vanadium/zinc as the primary sulfur reduction component may also be favorable in terms of overall sulfur reduction.

The amount of the primary sulfur reduction metal component in the sulfur reduction catalyst is normally from 0.2 to 5 weight percent, typically 0.5 to 5 weight percent, (as metal, relative to weight of sieve component) but amounts outside this range, for example, from 0.10 to 10 weight percent may still be found to give some sulfur removal effect. When the sieve is matrixed, the amount of the primary sulfur reduction metal component expressed relative to the total weight of the catalyst composition will, for practical purposes of formulation, typically extend from 0.1 to 5, more typically from 0.2 to 2 weight percent of the entire catalyst.

The second metal component of the sulfur reduction catalyst composition comprises a rare earth metal or metals which is present within the pore structure of the molecular sieve and is thought to be present in the form of cations exchanged onto the exchangeable sites present on the sieve component. The rare earth (RE) component significantly improves the catalyst stability in the presence of vanadium. For example, higher cracking activity can be achieved with RE+V/USY catalyst compared to a V/USY catalyst, while comparable gasoline sulfur reduction is obtained. Rare earths of the lanthanide series from atomic number from 57 to 71 such as lanthanum, cerium, dysprosium, praseodymium, samarium, europium, gadolinium, ytterbium and lutetium may be used in this way but from the point of view of commercial availability, lanthanum and mixtures of cerium and lanthanum will normally be preferred. In application Ser. No. 09/221,540, filed concurrently with this application, we show that cerium is the most effective rare earth component from the viewpoint of sulfur reduction as well as catalyst stability.

The amount of rare earth is typically from 1 to 10 wt. percent of the catalyst composition, in most cases from 2 to 5 wt. percent. Relative to the weight of the sieve, the amount of the rare earth will normally be from about 2 to 20 weight percent and in most cases from 4 to 10 weight percent of the sieve, depending on the sieve:matrix ratio.

The rare earth component can suitably be incorporated into the molecular sieve component by exchange onto the sieve, either in the form of the unmatrixed crystal or of the matrixed catalyst. When the composition is being formulated with the preferred USY zeolite sieve, a very effective manner of incorporation is to add the rare earth ions to the USY sieve (typically 2.445-2.465 nm unit cell size) followed by additional steam calcination to lower the unit cell size of the USY to a value typically in the range of 2.420 to 2.450 nm., after which the primary metal component may be added if not already present. The USY should have a low alkali metal (mainly sodium) content for stability as well as for satisfactory cracking activity; this will normally be secured by the ammonium exchange made during the ultrastabilization process to a desirable low sodium level of not more than 1 weight percent, preferably not more than 0.5 weight percent, on the sieve.

The metal components are incorporated into the catalyst composition in a way which ensures that they enter the interior pore structure of the sieve. The metals may be incorporated directly into the crystal or into the matrixed catalyst. When using the preferred USY zeolite as the sieve component, this can suitably be done as described above, by recalcining a USY cracking catalyst containing the rare earth component to ensure low unit cell size and then incorporating the metal, e.g. vanadium, by ion exchange or by impregnation under conditions which permit cation exchange to take place so that the metal ion is immobilized in the pore structure of the zeolite. Alternatively, the primary sulfur reduction component and the rare earth metal component can be incorporated into the sieve component, e.g. USY zeolite or ZSM-5 crystal, after any necessary calcination to remove organics from the synthesis after which the metal-containing component can be formulated into the finished catalyst composition by the addition of the cracking and matrix components and the formulation spray dried to form the final catalyst.

When the catalyst is being formulated as an integrated catalyst system, it is preferred to use the active cracking component of the catalyst as the sieve component of the sulfur reduction system, preferably zeolite USY, both for simplicity of manufacture but also for retention of controlled cracking properties. It is, however, possible to incorporate another active cracking sieve material such as zeolite ZSM-5 into an integrated catalyst system and such systems may be useful when the properties of the second active sieve material are desired, for instance, the properties of ZSM-5. The impregnation/exchange process should in both cases be carried out with a controlled amount of metal so that the requisite number of sites are left on the sieve to catalyze the cracking reactions which may be desired from the active cracking component or any secondary cracking components which are present, e.g. ZSM-5.

Use of Sulfur Reduction Catalyst Composition

Normally the most convenient manner to use the sulfur reduction catalyst will be as a separate particle additive to the catalyst inventory. In its preferred form, with zeolite USY as the sieve component, the addition of the catalyst additive to the total catalyst inventory of the unit will not result in significant reduction in overall cracking because of the cracking activity of the USY zeolite. The same is true when another active cracking material is used as the sieve component. When used in this way, the composition may be used in the form of the pure sieve crystal, pelleted (without matrix but with added metal components) to the correct size for FCC use. Normally, however, the metal-containing sieve will be matrixed in order to achieve adequate particle attrition resistance and to maintain satisfactory fluidization. Conventional cracking catalyst matrix materials such as alumina or silica-alumina, usually with added clay, will be suitable for this purpose. The amount of matrix relative to the sieve will normally be from 20:80 to 80:20 by weight. Conventional matrixing techniques may be used.

Use as a separate particle catalyst additive permits the ratio of sulfur reduction and cracking catalyst components to be optimized according to the amount of sulfur in the feed and the desired degree of desulfurization; when used in this manner, it is typically used in an amount from 1 to 50 weight percent of the entire catalyst inventory in the FCCU; in most cases the amount will be from 5 to 25 weight percent, e.g. 5 to 15 weight percent. About 10 percent represents a norm for most practical purposes. The additive may be added in the conventional manner, with make-up catalyst to the regenerator or by any other convenient method. The additive remains active for sulfur removal for extended periods of time although very high sulfur feeds may result in loss of sulfur removal activity in shorter times.

The alternative to the use of the separate particle additive is to use the sulfur reduction catalyst incorporated into the cracking catalyst to form an integrated FCC cracking/gasoline sulfur reduction catalyst. If the sulfur reduction metal components are used in combination with a sieve other than the active cracking component, for example, on ZSM-5 or zeolite beta when the main active cracking component is USY, the amount of the sulfur reduction component (sieve plus metals) will typically be up to 25 weight percent of the entire catalyst or less, corresponding to the amounts in which it may be used as a separate particle additive, as described above.

Other catalytically active components may be present in the circulating inventory of catalytic material in addition to the cracking catalyst and the sulfur removal additive. Examples of such other materials include the octane enhancing catalysts based on zeolite ZSM-5, CO combustion promoters based on a supported noble metal such as platinum, stack gas desulfurization additives such as DESOX™ (magnesium aluminum spinel), vanadium traps and bottom cracking additives, such as those described in Krishna, Sadeghbeigi, op cit and Scherzer, Octane Enhancing Zeolitic FCC Catalysts, Marcel Dekker, New York, 1990, ISBN 0-8247-8399-9. These other components may be used in their conventional amounts.

The effect of the present additives is to reduce the sulfur content of the liquid cracking products, especially the light and heavy gasoline fractions although reductions are also noted in the light cycle oil, making this more suitable for use as a diesel or home heating oil blend component. The sulfur removed by the use of the catalyst is converted to inorganic form and released as hydrogen sulfide which can be recovered in the normal way in the product recovery section of the FCCU in the same way as the hydrogen sulfide conventionally released in the cracking process. The increased load of hydrogen sulfide may impose additional sour gas/water treatment requirements but with the significant reductions in gasoline sulfur achieved, these are not likely to be considered limitative.

Very significant reductions in gasoline sulfur can be achieved by the use of the present catalysts, in some cases up to about 50% relative to the base case using a conventional cracking catalyst, at constant conversion, using the preferred form of the catalyst described above. Gasoline sulfur reduction of 25% is readily achievable with many of the additives according to the invention, as shown by the Examples below. The extent of sulfur reduction may depend on the original organic sulfur content of the cracking feed, with the greatest reductions achieved with the higher sulfur feeds. The metals content of the equilibrium catalyst in the unit may also affect the degree of desulfurization achieved, with a low metals content, especially vanadium content, on the equilibrium catalyst favoring greater desulfurization. Desulfurization will be very effective with E-catalyst vanadium contents below 1,000 ppm although the present catalysts remain effective even at much higher vanadium contents. Sulfur reduction may be effective not only to improve product quality but also to increase product yield in cases where the refinery cracked gasoline end point has been limited by the sulfur content of the heavy gasoline fraction; by providing an effective and economical way to reduce the sulfur content of the heavy gasoline fraction, the gasoline end point may be extended without the need to resort to expensive hydrotreating, with a consequent favorable effect on refinery economics. Removal of the various thiophene derivatives which are refractory to removal by hydrotreating under less severe conditions is also desirable if subsequent hydrotreatment is contemplated.

EXAMPLE 1

Preparation of Catalyst Series 1

All samples in Catalyst Series 1 were prepared from a single source of spray dried material, consisting of 50% USY, 21% silica sol and 29% clay. The USY had a starting unit cell size of 2.454 nm, SiO2/Al2O3 mol ratio of 5.46 and a total surface area of 810 m2 g−1.

A V/USY catalyst, Catalyst A, was prepared by slurrying the above spray dried catalyst with NH4OH at a pH of 6, followed by filtration, ammonium sulfate exchange and washing with water. The catalyst was calcined in the presence of steam at 1300° F. for 2 hours and impregnated with vanadyl oxalate. The steam calcination lowered the unit cell size of the zeolite and improved its stability in the presence of vanadium.

A V/USY catalyst, Catalyst B, was prepared in the same way as Catalyst A, with the exception that the initial slurrying of the catalyst was performed at a pH between 3.2 and 3.5.

Two RE+V/USY catalysts, Catalyst C and D were prepared in the same way as Catalyst B, with the exception that after ammonium sulfate exchange the catalysts were exchanged with solutions of rare earth chloride to add 2 and 4 wt % RE2O3 onto the catalyst, respectively. The rare earth solution that was used had some of its Ce3+ extracted out, thus contains only a little Ce ions.

A Ce+V/USY catalyst, Catalyst E was prepared in the same way as Catalyst B, with the exception that after ammonium sulfate exchange the catalyst was exchanged with a solution of cerium chloride to add 5% cerium (as CeO2) onto the catalyst.

These catalysts were then steamed deactivated, to simulate catalyst deactivation in an FCC unit, in a fluidized bed steamer at 770° C. (1420° F.) for 20 hours using 50% steam. The physical properties of the calcined and steam deactivated catalysts are summarized in Table 1.

TABLE 1

Physical Properties of the V, RE + V, and Ce + V USY/Silica Sol Catalysts

|  | V/USY Cat. A | V/USY Cat. B | RE + V/USY Cat. C | RE + V/USY Cat. D | Ce + V/USY Cat. E |
|---|---|---|---|---|---|
| Calcined Cat. |  |  |  |  |  |
| V loading, wt % | 0.36 | 0.37 | 0.39 | 0.38 | 0.39 |
| RE$_2$O$_3$ loading, wt % | N.A. | N.A. | 2.0 | 4.1 | 5.1 |
| Ce$_2$O$_3$, wt % | N.A. | N.A. | 0.49 | 0.95 | 4.95 |
| La$_2$O$_3$, wt % | N.A. | N.A. | 0.96 | 1.83 | 0.03 |
| Na$_2$O, wt % | 0.30 | 0.24 | 0.42 | 0.21 | 0.19 |
| Unit cell size, nm | 2.433 | 2.433 | 2.442 | 2.443 | 2.442 |

TABLE 1-continued

Physical Properties of the V, RE + V, and Ce + V USY/Silica Sol Catalysts

|  | V/USY Cat. A | V/USY Cat. B | RE + V/USY Cat. C | RE + V/USY Cat. D | Ce + V/USY Cat. E |
|---|---|---|---|---|---|
| Deactivated Cat. (CPS 770° C. 20 hrs) | | | | | |
| Surface area, $m^2g^{-1}$ | 255 | 252 | 249 | 248 | 284 |
| Unit cell size, nm | 2.425 | 2.424 | 2.4.26 | 2.428 | 2.428 |

EXAMPLE 2

Preparation of Catalyst Series 2

A V/USY catalyst, Catalyst F, was prepared using a USY zeolite with a silica-to-alumina ratio of 5.4 and unit cell size of 2.435 nm. A fluid catalyst was prepared by spray drying an aqueous slurry containing 50 wt % of the USY crystals in a silica sol/clay matrix. The matrix contained 22-wt % silica sol and 28-wt % kaolin clay. The spray-dried catalyst was exchanged with NH4+ by an exchange with a solution of ammonium sulfate and then dried. Then the USY catalyst was impregnated with a solution of vanadium oxalate to target 0.5 wt % V.

A RE+V/USY catalyst, Catalyst G, was prepared using a USY zeolite with a silica-to-alumina ratio of 5.5 and a unit cell size of 2.454 nm. The USY was exchanged with NH4+ by an exchange with a solution of ammonium sulfate. The NH4+ exchanged USY was then exchanged with rare earth cations (e.g., $La^{3+}$, $Ce^{3+}$, etc.) by exchange with a solution of mixed rare earth chlorides. The rare earth solution that was used had most of its $Ce^{3+}$ extracted out, thus contained very little Ce. The RE-exchanged USY was further washed, dried, and calcined in the presence of steam in a rotary calciner at 760° C. (1400° F.). The steam calcination lowered the unit cell size of the zeolite to 24.40 Å and improved its stability in the presence of vanadium. A fluid catalyst was prepared by spray drying an aqueous slurry containing 50 wt % of the RE-USY crystals in a silica sol/clay matrix. The matrix contained 22-wt % silica sol and 28-wt % kaolin clay. The spray-dried catalyst was exchanged with $NH_4^+$ by an exchange with a solution of ammonium sulfate and was then dried and calcined at 540° C. (1000° F.) for 2 hours. Following calcination, the RE/USY catalyst was impregnated with a $VOSO_4$ solution.

Catalyst H, was prepared using similar procedures as for Catalyst G except a solution of mixed RECl3 containing mostly CeCl3 was used to exchange the USY. Catalyst H was prepared using a commercial USY zeolite with a silica-to-alumina ratio of 5.5 and a unit cell size of 2.454 nm. The USY was exchanged with NH4+ by an exchange with a solution of ammonium sulfate. The NH4+-exchanged USY was then exchanged with a solution of CeCl3 containing some lanthanum. The exchanged USY was further washed, dried, and calcined in the presence of steam in a rotary calciner at 760° C. (1400° F.). The steam calcination lowered the unit cell size of the zeolite to 2.440 nm. A fluid catalyst was prepared by spray drying an aqueous slurry containing 50 wt % of the rare earth containing USY crystals in a silica sol/clay matrix. The matrix contained 22-wt % silica sol and 28-wt % kaolin clay. The spray-dried catalyst was exchanged with NH4+ by an exchange with a solution of ammonium sulfate and was then dried and calcined at 540° C. (1000° F.) for 2 hours. Following calcination, the catalyst was impregnated with a VOSO4 solution. Physical properties of the calcined catalysts are summarized in Table 2.

TABLE 2

Physical Properties of V/USY, RE + V/USY Silica-Sol Catalysts

|  | V/USY Catalyst F | RE + V/USY Catalyst G | RE + V/USY Catalyst H |
|---|---|---|---|
| Calcined Cat. | | | |
| V loading, wt % | 0.5 | 0.43 | 0.44 |
| $RE_2O_3$ loading, wt % | N.A. | 1.93 | 2.66 |
| $CeO_2$ loading, wt % | N.A. | 0.21 | 2.42 |
| $Na_2O$, wt % | 0.13 | 0.16 | 0.20 |
| Surface area, $m^2g^{-1}$ | 327 | 345 | 345 |
| Unit cell size, nm | 2.435 | — | — |

The above additives were tested for gas oil cracking activity and selectivity using the ASTM microactivity test (ASTM procedure D-3907). Two vacuum gas oil feed stocks were used to test the catalysts, a 1% sulfur gas oil feed for testing of gasoline sulfur reduction and a 2.6% sulfur gas oil feed for testing of catalyst stability. Properties of the feed stocks are shown in Table 3 below. A range of conversions was obtained by varying the catalyst-to-oil ratios with the reactions run at 527° C. (980° F.). The gasoline range product from each material balance was analyzed with a sulfur GC (AED) to determine the gasoline sulfur concentration. To reduce experimental errors in the sulfur concentration associated with fluctuations in distillation cut point of gasoline, the sulfur species ranging from thiophene to $C_4$-thiophenes in syncrude (excluding benzothiophene and higher boiling S species) were quantitated and the sum was defined as "cut-gasoline S."

TABLE 3

Properties of Vacuum Gas Oil Feeds

| Charge Stock Properties | Vacuum Gas Oil No. 1 | Vacuum Gas Oil No. 2 |
|---|---|---|
| API Gravity | 26.6 | 22.5 |
| Aniline Point, C. | 83 | 73 |
| CCR, wt % | 0.23 | 0.25 |
| Sulfur, wt % | 1.05 | 2.59 |
| Nitrogen, ppm | 600 | 860 |
| Basic nitrogen, ppm | 310 | 340 |
| Ni, ppm | 0.32 | — |
| V, ppm | 0.68 | — |
| Fe, ppm | 9.15 | — |
| Cu, ppm | 0.05 | — |
| Na, ppm | 2.93 | — |

TABLE 3-continued

Properties of Vacuum Gas Oil Feeds

| Charge Stock Properties | Vacuum Gas Oil No. 1 | Vacuum Gas Oil No. 2 |
|---|---|---|
| Simulated Distillation, ° C. | | |
| IBP, | 181 | 217 |
| 50 wt %, | 380 | 402 |
| 99.5%, | 610 | 553 |

EXAMPLE 3

Fluid Catalytic Cracking Evaluation of Series 1 Catalysts

The catalysts from Example 1 were steam deactivated in a fluidized bed steamer at 770° C. (1420° F.) for 20 hours using 50% steam and 50% gas. The gas stream was changed from air, N2, propylene, and to N2 for every ten minutes, then cycled back to air again to simulate the coking/regeneration cycle of a FCC unit (cyclic steaming). The steam deactivation cycle was ended with air-burn (ending-oxidation). Twenty-five weight percent of steamed additive catalysts were blended with an equilibrium catalyst of very low metals level (120 ppm V and 60 ppm Ni) from an FCC unit.

Performances of the catalysts are summarized in Table 4, where the product selectivity was interpolated to a constant conversion, 65 wt % conversion of feed to 220° C. or below (430° F.-) material.

Compared to the ECat base case, addition of V/USY and RE+V/USY catalyst made small changes in the overall product yield structure. There were slight increases in hydrogen and coke yields. Also a small changes in C4– gas, gasoline, light cycle oil and heavy fuel oil yields were observed. Addition of the V/USY and RE+V/USY catalysts changed the gasoline S concentration substantially. When 25 wt % of each of Catalyst A or B (V/USY reference catalysts) was blended with the equilibrium FCC catalyst, 39.0 and 40.8% reduction in gasoline sulfur concentration was achieved. When 25 wt % of RE/USY catalysts (Catalyst C and D) was added to the ECat Catalyst, the gasoline sulfur reduction activities are comparable to the reference catalysts (38-40%). The RE+V/USY catalyst containing mostly cerium as the rare earth metal (Catalyst E) gave a 43.1% reduction in gasoline S, to reduce the gasoline S content by about 4% additionally, i.e., 10% improvement over the V/USY and mixed RE/USY catalysts. All catalysts have a comparable vanadium loading (0.36-0.39%).

These results show that addition of rare earths improves the cracking activity of a V/USY catalyst. Changes in the cracked product yields are minor. Among rare earth ions, cerium exhibits a unique property in that the Ce+V/USY catalyst not only exhibits higher cracking activity but also exhibits increased gasoline sulfur reduction activity at fluid catalytic cracking conditions. The rare earth RE/USY catalyst without major amounts of cerium has no added benefit over V/USY for gasoline S reduction whereas the presence of cerium further lowered the gasoline sulfur level of the V/USY or RE/USY (without major cerium levels) catalysts.

TABLE 4

Catalytic Cracking Performance of Series 1 Catalysts

| | ECat Base Case | +25% V/USY Cat A | +25% V/USY Cat B | +25% RE + V/USY Cat C | +25% RE + V/USY Cat D | +25% RE + V/USY Cat E |
|---|---|---|---|---|---|---|
| MAT Product Yields | | | | | | |
| Conversion, wt % | 65 | 65 | 65 | 65 | 65 | 65 |
| Cat/Oil | 3.0 | 3.3 | 3.3 | 2.9 | 3.0 | 2.9 |
| H2 yield, wt % | 0.03 | +0.05 | +0.05 | +0.04 | +0.02 | +0.04 |
| C1 + C2 Gas, wt % | 1.1 | +0.1 | +0.1 | +0 | +0.1 | +0 |
| Total C3 Gas, wt % | 4.3 | +0.1 | +0.1 | −0.1 | +0 | −0.2 |
| C3= yield, wt % | 3.7 | +0.1 | +0.1 | +0 | +0 | −0.1 |
| Total C4 Gas, wt % | 9.3 | +0.1 | +0.2 | −0.1 | +0 | −0.3 |
| C4= yield, wt % | 4.7 | +0.3 | +0.4 | +0.4 | +0.1 | +0 |
| C5+ Gasoline, wt % | 47.6 | −0.6 | −0.4 | +0.4 | +0 | +0.5 |
| LFO, wt % | 29.6 | +0 | +0.2 | +0 | +0.1 | +0 |
| HFO, wt % | 5.4 | +0 | −0.2 | +0 | −0.1 | +0 |
| Coke, wt % | 2.4 | +0.3 | +0.0 | −0.2 | −0.1 | −0.1 |
| Cut Gasoline S, ppm | 618 | 377 | 366 | 369 | 382 | 352 |
| % Reduction in Cut Gasoline S | Base | 39.0 | 40.8 | 40.4 | 38.3 | 43.1 |

The cat-to-oil ratios in Table 4 show that the blends of deactivated V/USY and ECat require higher cat-to-oil ratio than the 100% ECat base case to achieve 65% conversion (3.3 vs. 3.0 Cat/Oil, i.e., about 10% reduction in activity). It is due to lower cracking activity of V/USY catalysts relative to the ECat. In comparison, addition of the RE+V/USY catalysts did not increase the cat-to-oil ratio to achieve 65% conversion. These cat-to-oil results indicate that the RE+V/USY catalysts are more stable and maintain their cracking activity better than the V/USY catalysts.

EXAMPLE 4

Comparison of Cracking Activity of Series 2 Catalysts.

The V and RE/V USY catalysts from Example 2 (Series 2 Catalysts) were steam deactivated at 790° C. (1420° F.) for various lengths of time to compare catalyst stability. The catalysts were steamed in a fluidized bed steamer for 2.3, 5.3, 10, 20, and 30 hours using 50% steam and 50% gas (cyclic steaming ending-reduction, as described above). The surface area retentions of the deactivated catalysts are plotted in FIG. 1.

The steam deactivated catalysts were tested for gas oil cracking activity using an ASTM microactivity test (ASTM procedure D-3907) with Vacuum Gas Oil No. 2 (above −2.6 wt % S). At a 30-second contact time and at 545 C (980° F.) reaction temperature, a weight percent conversion to 220° C.- (430° F.-) was measured at a constant catalyst-to-oil ratio of 4:1. Conversions as a function of steam deactivation time are plotted in FIG. 2.

The surface area retentions shown in FIG. 1 indicate that V/USY and RE+V/USY catalysts show comparable surface area retention upon various hydrothermal deactivation conditions suggesting that all three catalysts have comparable framework structure stability. However, the conversion plot shown in FIG. 2 clearly indicates that RE+V/USY have much improved cracking activity retention as severity of hydrothermal deactivation increases. Upon the hydrothermal deactivation, the improvement in cracking activity from the V/USY to RE+V version was about 15% conversion. No apparent differences were observed between the RE versions with varying amounts of cerium. These results are consistent with that of Example 3 where RE+V/USY achieved the target conversion at a lower cat-to-oil ratio than V/USY. These conversion results indicate that the RE+V/USY catalysts are more stable and maintain their cracking activity better than the V/USY catalysts. The addition of rare earth ions to the USY followed by steam calcination to lower the unit cell size of the zeolite improved catalyst stability in the presence of vanadium.

We claim:

1. A catalytic composition which comprises (i) a porous molecular sieve component, (ii) a first metal component comprising vanadium in an oxidation state greater than zero located within the interior pore structure of the porous molecular sieve component and (ii) a second metal component comprising at least one rare earth metal located within the interior pore structure of the porous molecular sieve component.

2. A catalytic composition according to claim 1 in which the porous molecular sieve component comprises a porous hydrocarbon cracking sieve component.

3. A catalytic composition according to claim 2 in which the porous molecular sieve component comprises zeolite USY having a UCS of from 2.420 to 2.455 nm and a bulk silica:alumina ratio of at least 5.0.

4. A catalytic composition according to claim 3 in which the porous molecular sieve component comprises zeolite USY having a UCS of from 2.420 to 2.435 nm and a bulk silica:alumina ratio of at least 5.0.

5. A catalytic composition according to claim 1 which contains from 0.2 to 5 weight percent vanadium as the first metal component, based on the weight of the zeolite, of the first metal component.

6. A catalytic composition according to claim 1 which comprises as the second metal component, a combination of cerium and at least one other rare earth.

7. A catalytic composition according to claim 1 in which the metal components have has been introduced into the zeolite as exchanged cationic species within the zeolite pores.

8. A catalytic composition according to claim 1 which is formulated as a fluidizable catalytic cracking product sulfur reduction catalyst additive having a particle size of from 20 to 100 microns, for reducing the sulfur content of a catalytically cracked gasoline fraction during the catalytic cracking process.

9. A catalytic composition according to claim 1 which is formulated as an integrated fluidizable catalytic cracking/product sulfur reduction catalyst for cracking a heavy hydrocarbon feed to produce liquid cracking products including gasoline and reducing the sulfur content of the catalytically cracked gasoline fraction during the catalytic cracking process, which comprises fluidizable particles having a size ranging from about 20 to about 100 microns of a hydrocarbon cracking component which comprises a zeolitic molecular sieve which contains the first metal component located within the pore structure of the zeolite and the second metal component.

10. An integrated fluidizable catalytic cracking/product sulfur reduction catalyst according to claim 9 which contains from 0.1 to 5 weight percent, based on the weight of the zeolite, of vanadium as the first metal component.

11. An integrated fluidizable catalytic cracking product sulfur reduction catalyst according to claim 9 in which the second metal component comprises a combination of cerium and at least one other rare earth in an amount from 1 to 5 weight percent of the catalyst.

12. An integrated fluidizable catalytic cracking product sulfur reduction catalyst according to claim 9 in which the zeolitic molecular sieve comprises zeolite USY having a UCS of from 2.420 to 2.455 nm and a bulk silica:alumina ratio of at least 5.0.

13. A fluidizable catalytic cracking product sulfur reduction catalyst composition according to claim 12 in which the porous molecular sieve component comprises zeolite USY having a UCS of from 2.420 to 2.435 nm and a bulk silica:alumina ratio of at least 5.0.

* * * * *